(12) United States Patent
Kondo

(10) Patent No.: US 6,556,839 B1
(45) Date of Patent: Apr. 29, 2003

(54) APPARATUS FOR AND METHOD OF CONTROLLING TRANSMISSION POWER

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 09/653,893

(22) Filed: Sep. 1, 2000

(30) Foreign Application Priority Data

Sep. 7, 1999 (JP) .......................................... 11-253534

(51) Int. Cl.[7] .................................................. H04Q 7/00
(52) U.S. Cl. ........................................ 455/522; 455/69
(58) Field of Search ................................ 455/422, 522, 455/69, 62, 63, 67.1; 370/318; 375/140, 141, 142, 144

(56) References Cited

U.S. PATENT DOCUMENTS

| 5,590,409 A | 12/1996 | Sawahashi et al. ........... 455/69 |
| 5,839,056 A | 11/1998 | Häkkinen .................... 455/69 |
| 5,844,935 A | 12/1998 | Shoji .......................... 375/200 |
| 6,032,026 A | 2/2000 | Seki et al. .................... 455/63 |

FOREIGN PATENT DOCUMENTS

| JP | 8-32514 | 2/1996 |
| JP | 9-139712 | 5/1997 |
| JP | 2723094 | 11/1997 |
| JP | 10-247894 | 9/1998 |
| JP | 11-17646 | 1/1999 |
| JP | 11-284570 | 10/1999 |
| WO | WO 98/59433 | 12/1998 |

Primary Examiner—Thanh Cong Le
(74) Attorney, Agent, or Firm—Foley & Lardner

(57) ABSTRACT

A reversely spreading unit 11 reversely spreads a digitally converted reception signal by using an assigned spreading code. A reception power and interference power measuring unit 14 calculates a reception power from a mobile station and/or an interference power. A total reception power calculator 3 calculates a total reception power that is a sum of reception signals of respective channels received at one reception antenna 6. Also, an SIR calculator 15 uses the total reception power, and the reception power from the mobile station and/or the interference power, and then calculating a signal to interference ratio (SIR) of the reception signal. A transmission power control information calculator 16 calculates a transmission power control information so that SIR of the reception signal approaches a necessary SIR.

18 Claims, 3 Drawing Sheets

APPARATUS FOR AND METHOD OF CONTROLLING TRANSMISSION POWER

BACKGROUND OF THE INVENTION

1. Field of the Invention

The present invention relates to an apparatus for and a method of controlling a transmission power, which is intended to solve a problem with regard to a far distance and a near distance between a mobile station and a base station.

2. Description of the Related Art

Conventionally, an apparatus for and a method of controlling a transmission power is applied to, for example, an apparatus for and a method of measuring a signal to interference ratio in a radio communication system, and a method of controlling a transmission power under a code division multiple access (CDMA) communication method.

Recently, a CDMA method is noted as a transfer method used in the radio communication system. This CDMA method employs a spectrum spread that is a multiple access method in which a frequency usage efficiency is excellent. Especially, in a cellular DS/CDMA (Direct Sequence/CDMA) mobile communication, in order to maintain a necessary line quality and increase a capacity of subscribers, a technique for controlling a transmission power, which solves a so-called problem with regard to a far distance and a near distance between a mobile station and a base station, is important although it is detailed as follows.

FIG. 1 is a view showing a conceptual configuration of a radio communication system to which a typical DS/CDMA communication method is applied. This radio communication system shown in FIG. 1 is provided with a base station and a plurality of mobile stations (terminal stations). So, information, such as voice, data and the like, are transmitted and received between one base station and the plurality of mobile stations.

Actually, multiplexing through a code is carried out in the CDMA method, when the base station transmits information to the plurality of mobile stations in the radio communication system shown in FIG. 1. Thus, a signal can be transmitted to all the mobile stations at the same frequency and at the same time. Also, as one method of attaining the transmission power control in the radio communication system shown in FIG. 1, there is a closed loop transmission power control in which the base station measures a value of a signal to interference ratio (SIR) of a reception signal from each mobile station, and then controls the transmission power of the mobile station based on the value so as to maintain a predetermined transmission power.

For example, the method of measuring the signal to interference ratio is described in detail in Japanese Laid Open Patent Application (JP-A-Heisei, 10-247849) entitled "APPARATUS FOR AND METHOD OF MEASURING SIGNAL TO INTERFERENCE RATIO, AND METHOD OF CONTROLLING TRANSMISSION POWER UNDER CDMA COMMUNICATION METHOD".

This apparatus for measuring a signal to interference ratio includes an interference replica signal generator, a subtracter, an interference power detector, a signal power detector and a signal to interference ratio calculator. The interference replica signal generator performs a reverse spread process on an input signal caused by a reception signal, and carries out a tentative judgment of an information symbol with regard to the input signal, and then outputs the component on which the spread process is again performed, as an interference replica signal. The subtracter subtracts the interference replica signal from the reception signal. The interference power detector detects an interference power information. The signal power detector detects a signal power information. The signal to interference ratio calculator calculates a signal to interference ratio from the interference power information and the signal power information.

Japanese Laid Open Patent Application (JP-A-Heisei, 9-139712) discloses "METHOD OF CONTROLLING TRANSMISSION POWER OF RADIO TRANSMITTER". This method is provided with the steps of: determining a standard value to indicate a quality of a signal received from a radio transmitter; determining a standard value to indicate a current traffic load in a radio cell; and instructing the radio transmitter to adjust the transmission power.

Japanese Patent No.2723094 discloses "CDMA RECEIVER". This CDMA receiver is designed so as to change an operation speed of a chip synchronizer for extracting a reverse spread timing on the basis of SIR determined in accordance with a desirable signal power and an interference signal power. In this CDMA receiver, the operation speed of the chip synchronizer is reduced when the SIR is deteriorated. Thus, it is possible to protect an erroneous operation of a reception timing caused by noise.

Japanese Laid Open Patent Application (JP-A-Heisei, 11-17646) discloses "METHOD OF CONTROLLING VARIABLE RATE CDMA TRANSMISSION POWER". In this method, an Eb/Io calculator calculates an Eb/Io value of an an signal power Eb per bit to an interference power Io per Hz, for each bit rate, from a reception base band signal rs from a reception processor. A maximum value detector detects a maximum value from the Eb/Io value. A comparator compares the maximum Eb/Io value with a target Eb/Io value. A transmission power control bit, which is intended to decrease a transmission power if the maximum Eb/Io value is greater than the target Eb/Io value and increase the transmission power in the opposite case, is transmitted to a multiplexer. So, a TPC bit and a transmission data td are multiplexed. Then, the multiplexed data is modulated, and a frequency conversion is performed on it, which is transmitted from a transmitter at a power based on the TPC bit. Accordingly, without the deterioration of transfer quality, it is possible to apply to a variable rate transfer to then control the transmission power at a high accuracy.

Moreover, Japanese Laid Open Patent Application (JP-A-Heisei, 8-32514) discloses "Method of And Apparatus for Controlling Transmission Power". In this technique, a mobile station measures an average of desirable wave reception signal powers per transmission power control period from a base station, and then detects a difference (relatively desirable wave reception signal power difference) ΔRSSI between the average and an average in one or more transmission power control periods earlier. If the ΔRSSI exceeds a predetermined standard power difference ΔPth, a transmission power control in an open loop to set a transmission power in accordance with the ΔRSSI is carried out in order to sharply drop the transmission power of the mobile station. If the ΔRSSI is equal to or less than the ΔPth, the transmission power is set in a closed loop based on the transmission power control bit. Thus, if a reception signal power at the mobile station is largely increased, the control is done so as to sharply drop the transmission power at the mobile station to thereby have no interference with other mobile stations.

However, in the conventional method of measuring the SIR, there may be a case that an SIR measurement accuracy is dropped under a fast fading environment, an interference between a plurality of stations, and a noise environment. If the transmission power is controlled in accordance with the SIR measured under above mentioned environments, this results in a problem that it has influence on the accuracy of the transmission power control.

The reason of the drop in the accuracy of the SIR measurement is as follows. That is, a value of an interference power (I) is smaller than a reception power (S). Thus, the normalization of an analog-to-digital conversion on the reception power (S) causes a drop of a accuracy of a value obtained by quantizing the interference power (I) having a relatively low level. Especially, a change of amplitude of the reception signal is large in the fading environment peculiar to the mobile communication system. This results in a problem that the accuracy of the value obtained by quantizing the interference power (I) is further dropped.

SUMMARY OF THE INVENTION

The present invention is accomplished in view of the above mentioned problems. Therefore, an object of the present invention is to provide an apparatus for and a method of controlling a transmission power, which can measure SIR having a high accuracy without any influence from the fading environment, the interference between a plurality of stations and the noise environment, by measuring an interference power in each communication channel for each sector of a base station.

In order to accomplish the object, an apparatus for controlling a transmission power according to a first aspect of the present invention includes an antenna, a plurality of processors and a total reception power calculator. The antenna receives a plurality of reception signals from a plurality of mobile stations. The plurality of processors processes said plurality of reception signals from said antenna to determine reception powers, respectively. The total reception power calculator calculates a total reception power based on said reception power outputted from each of said plurality of processors.

Each of the plurality of processors includes a reversely spreading unit, a reception power measuring unit, an SIR calculator, a transmission power control information calculator and a transmission section. The reversely spreading unit spreads said reception signal received by said antenna by using an assigned spreading code. The reception power measuring unit calculates said reception power based on the reversely spread reception signal outputted from said reversely spreading unit. The SIR calculator calculates a signal to interference ratio (SIR) of said reception signal based on said reception power calculated by said reception power measuring unit and said total reception power calculated by said total reception power calculator. The transmission power control information calculator calculates transmission power control information to make said SIR outputted from said SIR calculator equal to a predetermined SIR. The transmission section transmits said transmission power control information calculated in said transmission power control information calculator to one of said plurality of mobile stations.

In order to accomplish the object, a method for controlling a transmission power according to a second aspect of the present invention includes the steps of reversely spreading a reception signal outputted from each of a plurality of mobile stations by using an assigned spreading code, calculating a reception power based on the reversely spread reception signal, calculating a total reception power based on a plurality of the reception powers, calculating a signal to interference ratio (SIR) of the reception signal based on the reception power and the total reception power, calculating transmission power control information to approach the SIR to a predetermined SIR, and transmitting the transmission power control information to one of the plurality of mobile stations.

DESCRIPTION OF THE PREFERRED EMBODIMENTS

An apparatus for and a method of controlling a transmission power, according to embodiments of the present invention will be described below with reference to the attached drawings.

First Embodiment

Figure 1:
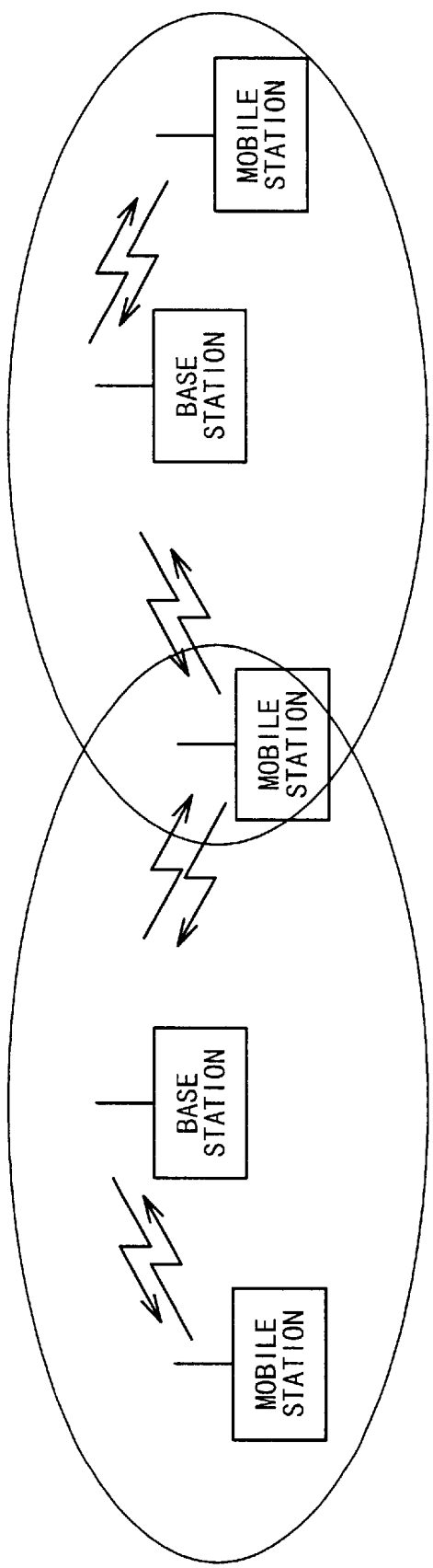
FIG. 1 is a view showing a conceptual configuration of a radio communication system to which a conventional DS/CDMA communication method is applied.
Figure 2:
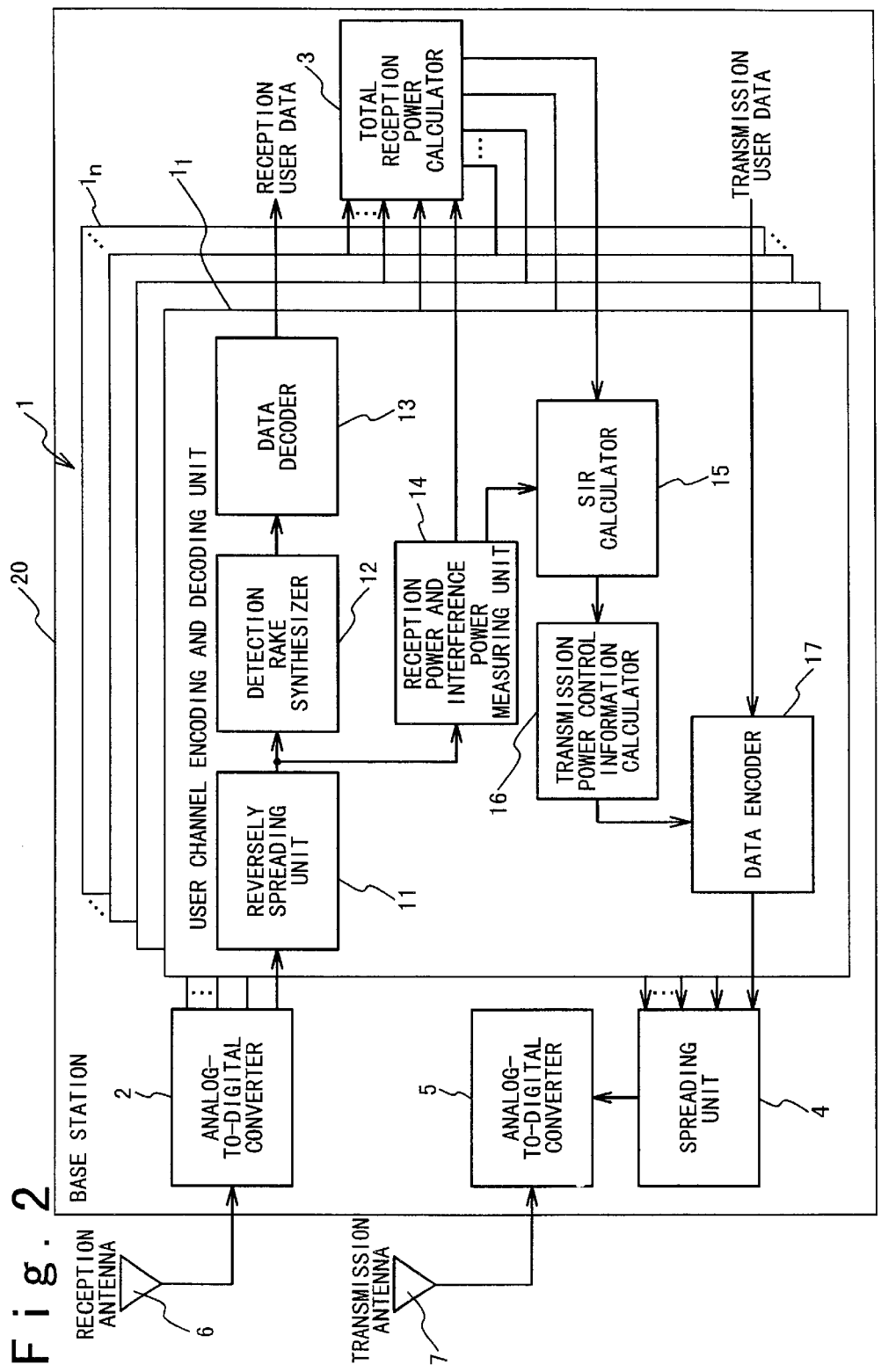
FIG. 2 is a block diagram conceptually showing a configuration of an apparatus for controlling a transmission power, according to first to third embodiments of the present invention.

FIG. 2 is a block diagram showing the configuration of an apparatus for controlling a transmission power, according to the first embodiment of the present invention. This apparatus for controlling a transmission power includes a base station 20, a reception antenna 6 and a transmission antenna 7. The reception antenna 6 and the transmission antenna 7 are connected to the base station 20. The base station 20 is composed of user channel encoding and decoding units $1_1$ to $1_n$, an analog-to-digital converter 2, a total reception power calculator 3, a spreading unit 4 and a digital-to-analog converter 5.

The plurality of the user channel encoding and decoding units $1_1$ to $1_n$ correspond to a plurality of user channels, respectively. Also, the plurality of the user channel encoding and decoding units $1_1$ to $1_n$ correspond to a plurality of processors of the present invention. Each of the user channel encoding and decoding units $1_1$ to $1_n$ is composed of a reversely spreading unit 11, a detection RAKE synthesizer 12, a data decoder 13, a reception power and interference power measuring unit 14, an SIR calculator 15, a transmission power control information calculator 16 and a data encoder 17. A transmission section of the present invention is composed of the data encoder 17, spreading unit 4, analog-to-digital converter 5, and transmission antenna.

In the apparatus for controlling the transmission power having the above-mentioned configuration, an analog signal from a mobile station (not shown) which is received via the reception antenna 6 is converted into a digital signal by the analog-to-digital converter 2. The converted digital signal is sent to each of the user channel encoding and decoding units $1_1$ to $1_n$.

The reversely spreading unit 11 of each of the user channel encoding and decoding units $1_1$ to $1_n$ reversely spreads the digital signal from the analog-to-digital converter 2 by using an assigned spreading code. The reversely spread signal is sent to the detection RAKE synthesizer 12 and the reception power and interference power measuring unit 14. The detection RAKE synthesizer 12 performs a detection and RAKE synthesis on the reversely spread signal, and sends to the data decoder 13. The data decoder 13 decodes the signal from the detection RAKE synthesizer 12, and outputs as a reception user data.

Also, the reception power and interference power measuring unit 14 calculates a reception signal power and an interference power based on the reversely spread signal. The reception signal power obtained by the calculation is sent to the total reception power calculator 3 and the SIR calculator 15. The total reception power calculator 3 calculates a total reception power implying a total power of a plurality of reception signals received by the reception antenna 6, and sends to the SIR calculator 15 in each of the user channel encoding and decoding units $1_1$ to $1_n$.

The SIR calculator 15 calculates SIR of the concerned user channel, in accordance with the total reception power obtained from the total reception power calculator 3 and the reception signal power obtained from the reception power and interference power measuring unit 14.

The transmission power control information calculator 16 calculates a transmission power control information so that the SIR in this apparatus for controlling the transmission power, with regard to a transmission signal sent from the mobile station, approaches a predetermined SIR.

The data encoder 17 encodes a transmission user data and the transmission power control information from the transmission power control information calculator 16, and sends the encoded signal to the spreading unit 4. The spreading unit 4 spreads and multiplexes the encoded signal, and sends to the digital-to-analog converter 5. The digital-to-analog converter 5 converts the spread and multiplexed digital signal into an analog signal, and sends to the transmission antenna 7. Thus, the transmission antenna 7 sends the analog signal from the digital-to-analog converter 5 to the mobile station.

Now, the operation of the apparatus for controlling a transmission power according to the first embodiment of the present invention will be described below. The reception power and interference power measuring unit 14 measures an ascending reception power "$S_j$" of a communication j. The total reception power calculator 3 calculates a total reception power "$S_{sum}$" in accordance with the following equation (1).

$$S_{sum}=S_1+S_2+S_3+\ldots+S_N \quad (1)$$

Here, "N" is the total number of communications performed in one antenna (hereafter, referred to as "Total Communication Number").

The SIR calculator 15 calculates a correction ascending interference power "$I'_j$" of the communication j in accordance with the following equation (2), and further calculates a ratio of an ascending signal to an interference power "$SIR_j$" of the communication j in accordance with the following equation (3).

$$I'_j=S_{sum}/PG_j \quad (2)$$

$$SIR_j=S_j/I'_j \quad (3)$$

Here, "$PG_j$" in the equation (2) is a spread gain of the communication j.

The transmission power control information calculator 16 compares a signal to interference ratio "$SIR_{target}$", which is a target to satisfy a service quality, with the ratio of the ascending signal to the interference power "$SIR_j$" of the communication j. As a result of the comparison, if "$SIR_{target}$"<"$SIR_j$", the transmission power control information calculator 16 generates transmission power control information for instructing the decrease in the transmission power of the mobile station. If "$SIR_{target}$">"$SIR_j$", the transmission power control information calculator 16 generates a transmission power control information for instructing the increase in the transmission power of the mobile station.

The mobile station decodes the transmission power control information included in a reception signal. If the decoded transmission power control information instructs the increase in the transmission power of the mobile station, the transmission power is increased by a predetermined amount. If the decoded transmission power control information instructs the decrease in the transmission power of the mobile station, the transmission power is decreased by a predetermined amount. Those operations enable the transmission power to be controlled at a high accuracy.

For example, if the total communication number is "4", $SIR_1$ of a communication 1 is calculated as follows. If $S_1=10$ μW in the communication 1, $S_2=20$ μW in the communication 2, $S_3=30$ μW in the communication 3, $S_4=20$ μW in the communication 4 and $PG_1=64$ in the communication 1, the $SIR_1$ is calculated as follows.

The following total reception power "$S_{sum}$" is obtained from the equation (1).

$$S_{sum}=S_1+S_2+S_3+S_4=10+20+30+40=80 \ [\mu W]$$

The following correction ascending interference power "$I'_1$" of the communication 1 is obtained from the equation (2).

$$I'_1=S_{sum}/PG_1=80/64=1.25 \ [\mu W]$$

The ratio of the ascending signal to the interference power "$SIR_1$" of the communication 1 is obtained from the equation (3).

$$SIR_1=S_1/I'_1=10/1.25=8 \rightarrow 9.0 \ [dB]$$

The SIRs from the communication 2 to the communication 4 can be calculated by using the method similar to the above-mentioned method.

As can be understood from the above-mentioned explanation, in the apparatus for controlling the transmission power, according to the first embodiment of the present invention, the base station determines the interference power of the reception signal by dividing an integrated value of the reception signal powers measured for each radio channel of the same sector, by a process gain. As a result, if the interference power of the reception signal is calculated in accordance with the reception signal power measured for each radio channel, its level is low, and a quantization error is large. Thus, it is impossible to improve the calculation accuracy. However, the calculation accuracy can be improved by calculating the interference power based on the reception signal powers of a large number of radio channels. The improvement of the calculation accuracy of the interference power can reduce a width of an error in the transmission power control. Hence, it is possible to increase the capacitance of subscribers.

Second Embodiment

The configuration of an apparatus for controlling a transmission power, according to a second embodiment of the present invention is similar to that of the apparatus for controlling a transmission power, according to the first embodiment shown in FIG. 2, except the function of the reception power and interference power measuring unit 14. The reception power and interference power measuring unit 14 according to the second embodiment sends the interference power to the total reception power calculator 3, and does not send the reception signal power as described in the first embodiment.

The operation of the apparatus for controlling a transmission power according to the second embodiment will be described below. The reception power and interference power measuring unit 14 measuring units an ascending interference power "$I_j$" of the communication j. The total reception power calculator 3 calculates the total reception power "$S_{sum}$" in accordance with the following equation (4).

$$S_{sum} = (I_1 \times PG_1 + I_2 \times PG_2 + I_3 \times PG_3 + \ldots + I_N \times PG_N)/N \tag{4}$$

Here, "N" is the total number of communications.

The SIR calculator 15 calculates the correction ascending interference power "$I'_j$" of the communication j in accordance with the equation (2), and further calculates the ratio of the ascending signal to the interference power "$SIR_j$" of the communication j in accordance with the equation (3).

The transmission power control information calculator 16 compares the signal to interference ratio "$SIR_{target}$", which is the target to satisfy the service quality, with the ratio of the ascending signal to the interference power "$SIR_j$" of the communication j. As a result of the comparison, if "$SIR_{target}$"<"$SIR_j$", the transmission power control information calculator 16 generates the transmission power control information of instructing the decrease in the transmission power of the mobile station, and if "$SIR_{target}$">"$SIR_j$", it generates the transmission power control information of instructing the increase in the transmission power of the mobile station.

The mobile station decodes the transmission power control information included in the reception signal. If the decoded transmission power control information instructs the increase in the transmission power of the mobile station, the transmission power is increased by the predetermined amount. If the decoded transmission power control information instructs the decrease in the transmission power of the mobile station, the transmission power is decreased by a predetermined amount. Those operations enable the transmission power to be controlled at a high accuracy.

For example, if the total communication number is "4", $SIR_1$ of the communication 1 is calculated as follows. If $I_1=2$ $\mu W$ in the communication 1, $I_2=4$ $\mu W$ in the communication 2, $I_3=10$ $\mu W$ in the communication 3 and $I_{4=}1$ $\mu W$ in the communication 4, and $PG_1=64$ in the communication 1, $PG_2=32$ in the communication 2, $PG_3=16$ in the communication 3 and $PG_4=6$ in the communication 4, the following total reception power "$S_{sum}$" is obtained from the equation (4).

$$S_{sum} = (I_1 \times PG_1 + I_2 \times PG_2 + I_3 \times PG_3 + I_3 \times PG_3)/4$$
$$= (2 \times 64 + 4 \times 32 + 10 \times 16 + 1 \times 64)/4$$
$$= 120 \ [\mu W]$$

The following correction ascending interference power "$I'_1$" of the communication 1 is obtained from the equation (2).

$$I'_1 = S_{sum}/PG_1 = 120/64 = 1.875 \ [\mu W]$$

The following ratio of the ascending signal to the interference power "$SIR_1$" of the communication 1 is obtained from the equation (3).

$$SIR_1 = S_1/I'_1 = 10/1.875 = 5.333 \rightarrow 7.3 [dB]$$

The SIRs from the communication 2 to the communication 4 can be calculated by using the method similar to the above-mentioned method.

As can be understood from the above-mentioned explanation, in the apparatus for controlling the transmission power according to the second embodiment of the present invention, the base station determines the interference power of the reception signal by averaging the interference powers of the reception signals measured for each radio channel of the same sector. As a result, if the interference power of the reception signal is calculated in accordance with the reception signal power measured for each radio channel, its level is low, and the quantization error is large. Thus, it is impossible to improve the calculation accuracy. However, the calculation accuracy can be improved by calculating the interference power based on the average of the interference powers measured for each radio channel. The improvement of the calculation accuracy of the interference power can reduce the width of the error in the transmission power control. Hence, it is possible to increase the capacitance of the subscribers.

Third Embodiment

The configuration of the apparatus for controlling a transmission power according to the third embodiment of the present invention is equal to that of the apparatus for controlling the transmission power according to the first embodiment shown in FIG. 2, except the function of the total reception power calculator 3. The total reception power calculator 3 according to the third embodiment uses as a total reception power the value in which the reception signal powers in a plurality of communications are averaged by using a temporal average. Since they are averaged by using the temporal average, the spread of the interference powers becomes small to further improve the calculation accuracy of SIR.

EXAMPLE 1

The example 1 in the third embodiment uses an averaging method by using a primary IIR filter using a oblivion coefficient. This operation will be described below.

The reception power and interference power measuring unit 14 measures an ascending reception signal power "$S_{j, t}$" of a communication j at a certain time t. The total reception power calculator 3 calculates a total reception power "$S_{sum, t}$" at the time t, in accordance with the following equation (5), and further calculates a total reception power "$S_{sum}$" on which a weight average is performed by using the oblivion coefficient over a past time, in accordance with the following equation (6).

$$S_{sum, t} = S_{1, t} + S_{2, t} + S_{3, t} + \ldots S_{N, t} \tag{5}$$

$$S_{sum} = \alpha \times S_{sum} + (1-\alpha) S_{sum, t} \tag{6}$$

The SIR calculator 15 calculates the correction ascending interference power "$I'_j$" of the communication j in accordance with the equation (2), and further calculates the ratio of the ascending signal to the interference power "$SIR_j$" of the communication j in accordance with the equation (3). Here, "$PG_j$" is the spread gain of the communication j, and "N" is the total communication number. Also, "α" is the oblivion coefficient. Although it can be a real number in a range between "1>α≧0". However, the actual "α" is in a range between "0.9 and 0.999".

Figure 3:
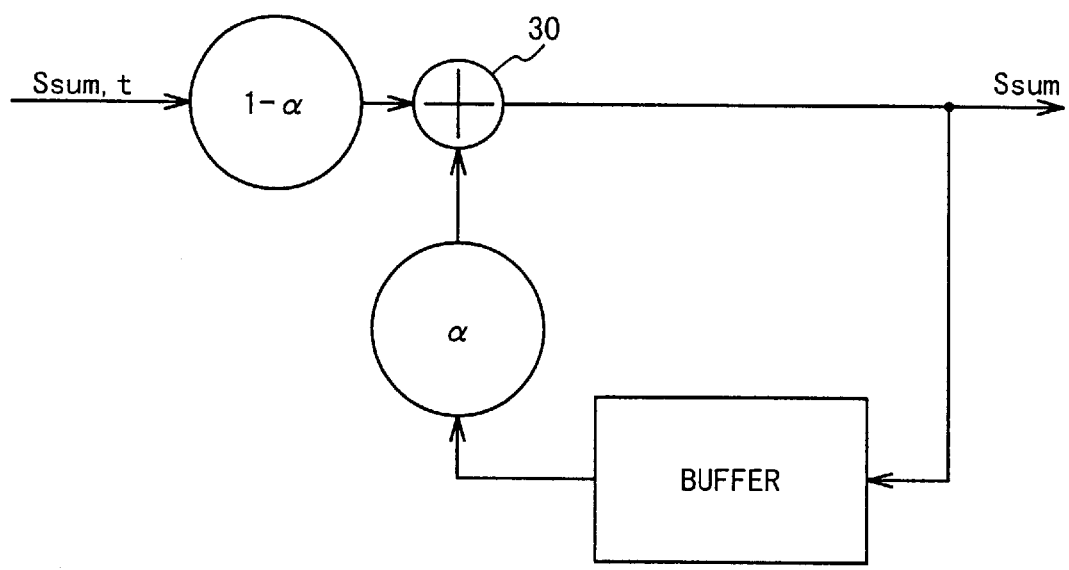
FIG. 3 is a block diagram showing a configuration example of a logic circuit applied to an example 1 in third embodiments of the present invention.

FIG. 3 is a block diagram showing the configuration example of a logic circuit for determining the total reception power "$S_{sum}$" on which the weight average is performed over the past time by using the oblivion coefficient α applied to the example 1. In FIG. 3, "$S_{sum,\ t}$" is a total reception power at a time t, and a coefficient "1−α" is multiplied thereto. The total reception power "$S_{sum}$" is fed back, and multiplied by the coefficient "α". Then, "α×$S_{sum}$" implying the multiplied result and "(1−α)$S_{sum,\ t}$" are added by an adder 30.

EXAMPLE 2

The example 2 in the third embodiment uses an averaging method by using a movement average for a certain time. The operation will be described below.

The reception power and interference power measuring unit 14 measures the ascending reception signal power "$S_{j,\ t}$" of the communication j at a certain time. The total reception power calculator 3 calculates the total reception power "$S_{sum,\ t}$" at the time t, in accordance with the equation (5), and further calculates a total reception power "$S_{sum}$" averaged over a past time "M", in accordance with the following equation (7).

$$S_{sum}=(S_{sum,\ t}+S_{sum,\ t-1}+S_{sum,\ t-2}+\ldots+S_{sum,\ t-(M-1)})/m \quad (7)$$

The SIR calculator 15 calculates the correction ascending interference power "$I'_j$" of the communication j in accordance with the equation (2), and further calculates the ratio of the ascending signal to the interference power "$SIR_j$" of the communication j in accordance with the equation (3). Here, "$PG_j$" is the spread gain of the communication j, and "N" is the total communication number.

According to the first to third embodiments, the interference power of each communication channel within the sector is determined based on the total reception power (S) and/or the total interference power (I) for each sector in the base station. Thus, the SIR having the higher accuracy can be measured without any influence from the fading environment, the interference between the plurality of stations, and the noise environment.

It should be noted that the above-mentioned preferred embodiments are a part of the present invention. However, it is not limited to the embodiments. Various variations may be made thereto, in the range without departing from the spirit and scope of the present invention.

As can be understood from the above-mentioned explanations, the apparatus for and the method of controlling a transmission power according to the present invention carries out the reverse spread by using the spreading code to which the digitally converted reception signal is assigned, and calculates at least one of the interference power and the reception power from the mobile station, and then calculates the total reception power which is the sum of the reception signals of at least two channels received in the same antenna. Also, it calculates the signal to interference ratio (SIR) of the reception signal by using the total reception power and the reception power and/or the interference power from the mobile station, and further calculates the transmission power control information so that the SIR of the reception signal approaches the predetermined SIR.

Therefore, in the mobile station, it is possible to decode the transmission power control information included in the reception signal, and also possible to control the transmission power of the mobile station to the correct condition, and further possible to carry out the transmission power control at the high accuracy.

What is claimed is:

1. An apparatus for controlling a transmission power, comprising:
    an antenna which receives a plurality of reception signals from a plurality of mobile stations;
    a plurality of processors which processes said plurality of reception signals from said antenna to determine reception powers, respectively; and
    a total reception power calculator which calculates a total reception power based on said reception power outputted from each of said plurality of processors;
    wherein each of said plurality of processors includes:
        a reversely spreading unit which spreads said reception signal received by said antenna by using an assigned spreading code;
        a reception power measuring unit which calculates said reception power based on the reversely spread reception signal outputted from said reversely spreading unit;
        an SIR calculator which calculates a signal to interference ratio (SIR) of said reception signal based on said reception power calculated by said reception power measuring unit and said total reception power calculated by said total reception power calculator;
        a transmission power control information calculator which calculates transmission power control information to make said SIR outputted from said SIR calculator equal to a predetermined SIR; and
        a transmission section which transmits said transmission power control information calculated in said transmission power control information calculator to one of said plurality of mobile stations.

2. The apparatus for controlling a transmission power according to claim 1, wherein
    said SIR calculator calculates a correction interference power by dividing said total reception power from said total reception power calculator by a spread gain used in said reversely spreading unit, and calculates SIR by dividing said reception power by said correction interference power.

3. The apparatus for controlling a transmission power according to claim 1, wherein
    said total reception power calculator calculates said total reception power by averaging said reception power outputted from each of said plurality of processors using a temporal average.

4. The apparatus for controlling a transmission power according to claim 3, wherein
    said temporal average is performed by using a primary IIR filter with a oblivion coefficient.

5. The apparatus for controlling a transmission power according to claim 3, wherein
    said temporal average is performed by using moving average with a constant time.

6. An apparatus for controlling a transmission power, comprising:
    an antenna which receives a plurality of reception signals from a plurality of mobile stations;
    a plurality of processors which processes said plurality of reception signals from said antenna to determine interference powers, respectively; and
    a total reception power calculator which calculates a total reception power based on said interference power outputted from each of said plurality of processors;

wherein each of said plurality of processors includes:
  a reversely spreading unit which spreads a reception signal received by said antenna by using an assigned spreading code;
  an interference power measuring unit which calculates said interference power based on the reversely spread reception signal outputted from said reversely spreading unit;
  an SIR calculator which calculates a signal to interference ratio (SIR) of said reception signal based on said interference power calculated by said interference power measuring unit and said total reception power calculated by said total reception power calculator;
  a transmission power control information calculator which calculates transmission power control information to make said SIR outputted from said SIR calculator equal to a predetermined SIR; and
  a transmission section which transmits said transmission power control information calculated in said transmission power control information calculator to one of said plurality of mobile stations.

7. The apparatus for controlling a transmission power according to claim 6, wherein
  said SIR calculator calculates a correction interference power by dividing said total reception power from said total reception power calculator by a spread gain used in said reversely spreading unit, and calculates SIR by dividing said reception power by said correction interference power.

8. The apparatus for controlling a transmission power according to claim 6, wherein
  said total reception power calculator calculates said total reception power by averaging products between said interference power from each of said interference power measuring unit and a spread gain used in said reversely spreading unit.

9. The apparatus for controlling a transmission power according to claim 8, wherein
  said SIR calculator calculates a correction interference power by dividing said total reception power from said total reception power calculator by a spread gain used in said reversely spreading unit, and calculates SIR by dividing said reception power by said correction interference power.

10. A method of controlling a transmission power comprising:
  (A) reversely spreading a reception signal outputted from each of a plurality of mobile stations by using an assigned spreading code;
  (B) calculating a reception power based on said reversely spread reception signal;
  (C) calculating a total reception power based on a plurality of said reception powers;
  (D) calculating a signal to interference ratio (SIR) of said reception signal based on said reception power and said total reception power;
  (E) calculating transmission power control information to make said SIR equal to a predetermined SIR; and
  (F) transmitting said transmission power control information to one of said plurality of mobile stations.

11. The method of controlling a transmission power according to claim 10, wherein said step (D) comprising:
  calculating a correction interference power by dividing said total reception power by a spread gain used in said step (A); and
  calculating SIR by dividing said reception power by said correction interference power.

12. The method for controlling a transmission power according to claim 10, wherein said step (C) comprises:
  calculating said total reception power by averaging said spread reception powers by using a temporal average.

13. The method for controlling a transmission power according to claim 12, wherein
  said temporal average is performed by using a primary IIR filter with a oblivion coefficients.

14. The method for controlling a transmission power according to claim 12, wherein
  said temporal average is performed by using moving average with constant time.

15. A method for controlling a transmission power comprising:
  (A) reversely spreading a reception signal outputted from each of a plurality of mobile stations by using an assigned spreading code;
  (B) calculating an interference power based on said reversely spread reception signal;
  (C) calculating a total reception power based on a plurality of said interference powers;
  (D) calculating a signal to interference ratio (SIR) of said reception signal based on said interference power and said total reception power;
  (E) calculating transmission power control information to make said SIR equal to a predetermined SIR; and
  (F) transmitting said transmission power control information to one of said plurality of mobile stations.

16. The method for controlling a transmission power according to claim 15, wherein said step (D) comprises:
  calculating a correction interference power by dividing said total reception power by a spread gain used in said step (A); and
  calculating SIR by dividing said reception power by said correction interference power.

17. The method for controlling a transmission power according to claim 15, wherein said step (C) comprises:
  calculating said total reception power by averaging said spread reception powers by using a temporal average.

18. The method for controlling a transmission power according to claim 17, wherein said step (D) comprises:
  calculating a correction interference power by dividing said total reception power by a spread gain used in said step (A); and
  calculating SIR by dividing said reception power by said correction interference power.

* * * * *